March 20, 1962
J. A. ASHBAUGH
3,026,387
LUBRICANT PRESSURE CONTROL VALVE
Filed Sept. 12, 1960
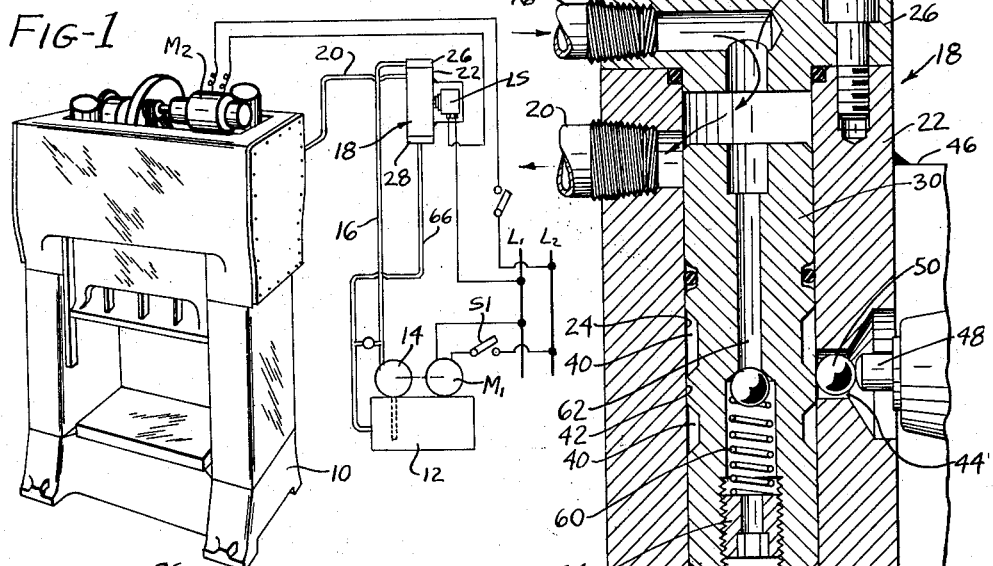
FIG-1
FIG-3
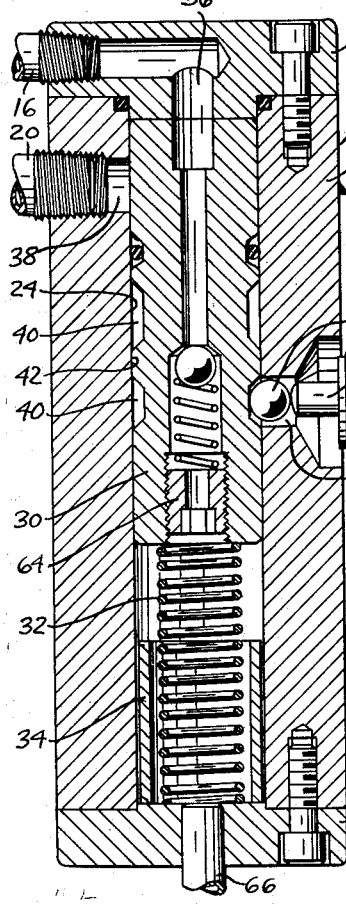
FIG-2
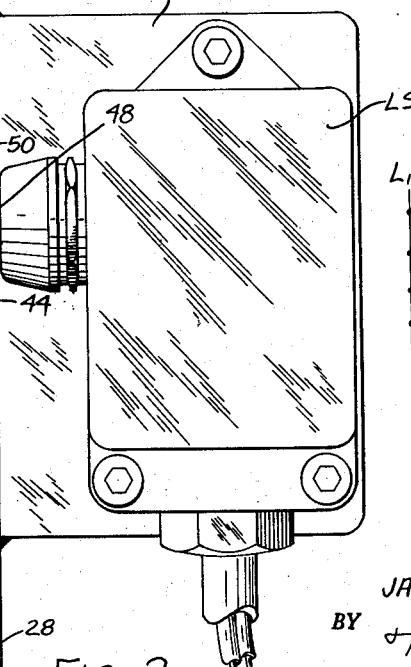
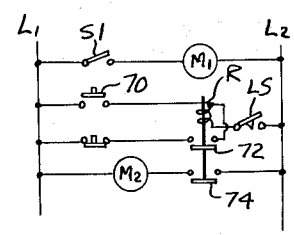
FIG-4
INVENTOR.
JAMES A. ASHBAUGH
BY Toulmin & Toulmin
ATTORNEYS

United States Patent Office 3,026,387
Patented Mar. 20, 1962

3,026,387
LUBRICANT PRESSURE CONTROL VALVE
James A. Ashbaugh, Minster, Ohio, assignor to Minster Machine Company, Minster, Ohio, a corporation of Ohio
Filed Sept. 12, 1960, Ser. No. 55,212
10 Claims. (Cl. 200—82)

This invention relates to a lubrication control system for machine tools and the like and is particularly concerned with an arrangement sensitive to lubricant pressure in a machine for controlling the operation thereof.

Many machine tools and the like are provided with pressure lubricating systems and it is desirable that the lubricant pressure be built up to a predetermined value before the machine can be operated. This can be accomplished by a pressure switch connected to receive pressure from the lubricant supply system. While an arrangement of this nature insures that there will be pressure on the lubricant up to the pressure switch, it does not take into account the fact that the lubricant may become too highly viscous on account of being cold so that it does not flow or that there may be blockage in the lubricant supply system down stream of the pressure switch.

Under the circumstances last referred to improper lubrication of the machine will be had and a desirable objective of the present invention is to prevent operation of a machine under these conditions.

Another object of this invention is the provision of a lubricant pressure sensitive machine controlling arrangement that can readily be connected into the lubricant supply system and the control system of existing machines as well as new machines.

A still further object of this invention is the provision of an arrangement for maintaining a substantially uniform working pressure with oils of varying viscosities.

A particular object of this invention is the provision of a pressure sensitive device which will interrupt the operation of a machine in response to either low or high lubricant pressures therein.

A still further object is the provision of a pressure sensitive device of the nature referred to which will control the operation of the machine to which it is attached and which also includes provision for protecting the lubricant system from excessively high pressures.

These and other objects of this invention will become more apparent upon reference to the following specification taken in connection with the accompanying drawings in which:

FIGURE 1 is a diagrammatic representation of a machine tool such as a press having a control system according to this invention;

FIGURE 2 is a vertical sectional view through the control device with the parts thereof in the position which they occupy when there is no pressure supply in the lubricant system;

FIGURE 3 is a fragmentary view similar to FIGURE 2 which shows the device when there is a supply of lubricant thereto within the desired pressure range; and FIGURE 4 is a diagrammatic view showing one manner of incorporating the control device in the control system for the machine.

Referring to the drawings somewhat more in detail, in FIGURE 1 there is a press 10 which has the usual operating instrumentalities thereon such as a rotating crankshaft that is journalled in the press frame and connected with the press platen by a connecting rod. A gear train connects the crankshaft with an electric drive motor.

In a press arrangement of this nature there are a number of critical areas that must be lubricated and which areas include the crankshaft bearing, and which could also include the guides for the platen and the like. It is in connection with the supply of lubricant to these points that the present invention is concerned.

For supplying lubricant to the press there is a sump or reservoir 12 and a lubricant pump 14 has its suction side connected to the sump and its pressure side connected to a conduit 16 leading to the inlet of a valve arrangement 18 according to this invention. The valve arrangement 18 has an outlet connected by conduit 20 with the lubricant supply system in the press.

A motor M-1 is connected with pump 14 and is adapted for being energized to drive the pump 14 by closing of a switch S-1.

The electric motor for the press is indicated at M-2 and energization of this motor will actuate the gear train leading to the press crankshaft and within which gear train there is the usual clutch and brake mechanisms for controlling the operation of the press platen.

Turning now to FIGURES 2 and 3, it will be seen that the valve arrangement 18 comprises a casing 22 having an axial bore 24 extending therethrough. End caps 26 and 28 mounted on the casing closes the opposite ends of the bore.

A valve member 30 is reciprocably mounted in the bore and is urged toward the upper end therof by a spring 32 in the lower end of the bore which bears against the lower end cap 28 and is disposed inside stop sleeve 34.

It will be noted in FIGURES 2 and 3 that the inlet conduit 16 is connected to upper end cap 26 and that a passage 36 leads through the upper end cap to the upper end of the bore thus providing an inlet for bore 24.

Conduit 20, on the other hand, is connected with bore 24 through the side wall of casing 22 so that when valve member 30 is in its FIGURE 2 position, communication between the inlet and outlet is interrupted. It will also be evident, however, that a supply of pressure fluid from conduit 16 through inlet 36 into bore 24 will tend to urge member 30 downwardly against the bias of spring 32 while outlet 38 connected with conduit 20 commences to open and at which time oil under pressure will be supplied to conduit 20.

The member 30 is provided with spaced annular grooves 40 that define therebetween an annular ridge 42. A hole 44 in the wall of casing 22 registers with the lower one of grooves 40 when the valve member 30 is in its FIGURE 2 position. This arrangement is availed of for controlling a limit switch LS that is supported on a bracket member 46 attached to casing 22. Switch LS has an operating plunger 48 aligned with hole 44 and there is a ball 50 in the hole against which plunger 48 bears.

It will be evident at this point that a predetermined downward movement of member 30 will cause ball 50 to ride up the incline at the upper edge of lower groove 40 until it rests on top of ridge 42 and at which time switch LS will be actuated.

A particular feature of the present invention resides in the fact that as member 30 continues its downward movement the ball 50 will drop into the upper annular groove 40 thus releasing switch LS from its actuated position. The outlet 38 is so arranged that there must be a predetermined minimum pressure supplied to inlet 36 in order to move member 30 downwardly to the point where switch LS is actuated. For a predetermined increase in pressure the switch remains actuated and the member 30 continues its downward movement thus increasing the effective area of outlet 38.

Should the pressure increase beyond this point, however, and it would represent excessive pressure in the lubricant supply system, the member 30 will be moved downwardly far enough to permit ball 50 to drop into the upper of grooves 40 thus releasing switch LS.

A still further increase in pressure at the inlet of the valve device will then be accompanied by opening of relief valve 60 which is located in bore 62 that extends axially through member 30. This relief valve comprises a ball spring urged toward a seat in bore 62 with the bias of the spring being adjustable by hollow plug 64 at the time the valve device is assembled.

Any oil that passes through the relief valve is drained from the lower end of the casing by way of conduit 66 which leads back to sump 12.

FIGURE 4 will illustrate the manner in which the device of the present invention could be embodied in an electric control circuit. In FIGURE 1 the motor M-1 is connected in series with its control switch S-1 between the power lines L-1 and L-2.

The switch LS is connected in series with the operating coil of a relay R and a normally open start switch 70 between the power lines L-1 and L-2. It will be apparent that the coil of relay R can be energized only when switch LS is closed and any time switch LS is opened, either on account of loss of pressure in the lubricant system, or excessive pressures therein, relay R will become deenergized.

Relay R, in addition to a holding blade 72 also has a blade 74 in circuit with motor M-2 between power lines L-1 and L-2 whereby the aforementioned control of relay R is also effective for controlling the main drive motor M-2.

From the foregoing it will be appreciated that the device of the present invention can be utilized for controlling, not only presses of the nature illustrated and described, but other machines as well. In any case, the machine could be operated only when the lubricant supply pressure fell between preselected open and lower limits which would insure an adequate supply of lubricant to the critical points of the machine and at an adequate pressure. The device automatically compensates for changes in the viscosity of the lubricant while preventing operation of the machine if the viscosity changes beyond predetermined relatively wide limits.

The invention has been illustrated and described with particular reference to the control of a machine tool in response to oil pressure. It will be evident, however, that other processes, such as chemical processes, could be controlled in this same manner. It will accordingly be understood that it is intended for the device of the present invention to be covered broadly as a device sensitive to fluid pressure.

It will be understood that this invention is susceptible to modification in order to adapt it to different usages and conditions; and, accordingly, it is desired to comprehend such modifications within this invention as may fall within the scope of the appended claims.

I claim:

1. In a device for controlling a switch in response to fluid pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and ridge means on said member forming switch actuating means operable for engaging and actuating a switch when said member moves a predetermined distance away from said one end and partially uncovers said outlet, said ridge means also being operable upon movement of said member a predetermined further distance less than enough to uncover said outlet completely for releasing said switch.

2. In a device for controlling a switch in response to fluid pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, said means comprising an annular ridge on said member formed by spaced annular grooves therein.

3. In a device for controlling a switch in response to oil pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, said means comprising an annular ridge on said member formed by spaced annular grooves therein, and a hole in the casing past which said ridge moves as the member is moved by a supply of oil under pressure to said inlet for receiving switch actuating means adapted for cooperation with said ridge.

4. In a device for controlling a switch in response to oil pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, there being a drain from the other end of said casing, and a relief valve having its inlet connected to the said inlet in said casing and its outlet connected to said drain.

5. In a device for controlling a switch in response to oil pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, there being a drain from the other end of said casing, a bore extending axially through said member, and a relief valve in said bore opening toward said drain.

6. In a device for controlling a switch in response to fluid pressure; a casing having an axial bore, a member slidably fitting said bore, a spring urging the member toward one end of the bore, an oil inlet in the casing at said one end of the bore whereby fluid under pressure supplied to said inlet will urge the member against the bias of said spring toward the other end of the bore, an outlet in the said wall of the casing positioned so as to be closed by said member when there is no pressure at said inlet, and to be opened by said member as the member moves against the bias of said spring, spaced annular grooves in said member, a hole in the side wall of said member, and means extending through said hole engageable with said grooves and the ridge therebetween for producing axial movement of the said means as said member reciprocates in the casing.

7. In a device for controlling a switch in response to fluid presure; a casing having an axial bore, a member slidably fitting said bore, a spring urging the member toward one end of the bore, an oil inlet in the casing at said one end of the bore whereby fluid under pressure supplied to said inlet will urge the member against the bias of said spring toward the other end of the bore, an outlet in the said wall of the casing positioned so as to be closed by said member when there is no pressure at said inlet, and to be opened by said member as the member moves against the bias of said spring, spaced annular grooves in said member, a hole in the side wall of said member, and means extending through said hole engageable with said grooves and the ridge therebetween for producing axial movement of the said means as said member reciprocates in the casing, a switch supporting bracket on said casing, and a switch on said bracket having an operating plunger aligned with said hole and engaged by said means adapted for being actuated only when the said means is engaged by the ridge on the member between said annular grooves.

8. In a device for controlling a switch in response to oil pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, there being a drain from the ohter end of said casing, and a relief valve having its inlet connected to the said inlet in said casing and its outlet connected to said drain, abutment means in said casing adapted for engaging said member in an extreme position of movement away from said inlet, and said relief valve being adjusted so as to open only after said member engages said abutment means.

9. A device as called for in claim 8 in which said relief valve is in said member.

10. In a device for controlling a switch in response to oil pressure; a casing having an axial bore, a member slidably fitting said bore, a spring urging the member toward one end of the bore, an oil inlet in the casing at said one end of the bore so oil under pressure supplied to said inlet will urge the member toward the other end of the bore, an outlet in the casing positioned to be closed by said member when there is no pressure at said inlet, and means on said member operable for actuating a switch when said member moves away from said one end and uncovers said outlet, said means also being operable for releasing said switch before the outlet is fully uncovered, there being a drain from the other end of said casing, a bore through said member from end to end having a seat therein facing the drain end of said casing, and a valve member in said bore spring urged toward said seat forming a relief valve having its inlet connected to the inlet end of said casing and its outlet connected to the drain end of said casing.

References Cited in the file of this patent

UNITED STATES PATENTS

| 1,942,180 | Martin | Jan. 2, 1934 |
| 2,297,917 | Schmidt | Oct. 6, 1942 |
| 2,523,666 | Moth | Sept. 26, 1950 |
| 2,753,414 | Stevenson | July 3, 1956 |
| 2,800,548 | Stary | July 23, 1957 |
| 2,857,491 | Harter | Oct. 21, 1958 |